United States Patent
Binks et al.

(10) Patent No.: US 10,144,524 B2
(45) Date of Patent: Dec. 4, 2018

(54) ASSEMBLY FOR MOUNTING A TURBINE ENGINE TO A PYLON

(71) Applicant: Rohr, Inc., Chula Vista, CA (US)

(72) Inventors: Alan J. Binks, San Diego, CA (US); Allan R. Penda, Amston, CT (US)

(73) Assignee: Rohr, Inc., Chula Vista, CA (US)

( * ) Notice: Subject to any disclaimer, the term of this patent is extended or adjusted under 35 U.S.C. 154(b) by 293 days.

(21) Appl. No.: 13/918,439

(22) Filed: Jun. 14, 2013

(65) Prior Publication Data

US 2014/0369810 A1  Dec. 18, 2014

(51) Int. Cl.
B64D 27/26 (2006.01)

(52) U.S. Cl.
CPC ........ B64D 27/26 (2013.01); B64D 2027/266 (2013.01); B64D 2027/268 (2013.01)

(58) Field of Classification Search
CPC ........ B64D 2027/266; B64D 2027/268; B64D 27/26; B64D 2027/264; F02C 7/00; F02C 7/36; F01D 25/28; F23R 3/60; Y02T 50/44
USPC ................. 244/54, 53 R
See application file for complete search history.

(56) References Cited

U.S. PATENT DOCUMENTS

| | | | |
|---|---|---|---|
| 4,428,189 A | 1/1984 | Greenberg et al. | |
| 4,687,413 A | 8/1987 | Prario | |
| 4,725,019 A * | 2/1988 | White | 244/54 |
| 5,176,339 A * | 1/1993 | Schmidt | 244/54 |
| 5,181,675 A * | 1/1993 | Lardellier et al. | 244/54 |
| 5,277,382 A | 1/1994 | Seelen et al. | |
| 5,351,930 A * | 10/1994 | Gwinn et al. | 248/557 |
| 5,524,847 A * | 6/1996 | Brodell et al. | 244/54 |
| 5,738,490 A * | 4/1998 | Pizzi | 415/139 |
| 5,762,472 A * | 6/1998 | Pizzi et al. | 415/135 |
| 5,988,975 A * | 11/1999 | Pizzi | 415/139 |
| 6,330,995 B1 | 12/2001 | Mangeiga et al. | |
| 6,494,403 B2 * | 12/2002 | Jule et al. | 244/54 |
| 6,607,165 B1 | 8/2003 | Manteiga et al. | |
| 6,843,449 B1 | 1/2005 | Manteiga et al. | |
| 7,165,743 B2 * | 1/2007 | Pasquer | B64D 27/26 244/54 |
| 8,128,021 B2 | 3/2012 | Suciu et al. | |
| 8,167,237 B2 | 5/2012 | Suciu et al. | |
| 8,197,191 B2 | 6/2012 | Binks et al. | |
| 8,267,642 B2 | 9/2012 | Binks et al. | |
| 8,827,203 B2 * | 9/2014 | Balk | 244/54 |
| 2004/0245383 A1 * | 12/2004 | Udall | 244/54 |
| 2005/0056726 A1 * | 3/2005 | Mayes | 244/54 |
| 2005/0263643 A1 * | 12/2005 | Stretton et al. | 244/53 R |
| 2006/0038066 A1 * | 2/2006 | Udall et al. | 244/54 |
| 2008/0001039 A1 * | 1/2008 | Winter et al. | 244/53 R |
| 2008/0073460 A1 * | 3/2008 | Beardsley et al. | 244/54 |
| 2008/0105782 A1 * | 5/2008 | Beardsley | 244/54 |
| 2008/0135679 A1 * | 6/2008 | Udall | 244/54 |

(Continued)

*Primary Examiner* — Medhat Badawi
(74) *Attorney, Agent, or Firm* — O'Shea Getz P.C.

(57) ABSTRACT

An assembly is provided for mounting a turbofan engine to a pylon. The turbofan engine includes a fan section and an engine core. The mounting assembly includes a fan case, a first mount and a second mount. The fan case is configured to house the fan section of the turbofan engine. The first mount is connected to the fan case, and configured to mount the fan case to the pylon. The second mount is connected to the fan case, and configured to mount the fan case to the pylon.

13 Claims, 7 Drawing Sheets

(56) References Cited

U.S. PATENT DOCUMENTS

| | | | |
|---|---|---|---|
| 2008/0169378 A1 | 7/2008 | Beaufort et al. | |
| 2008/0258016 A1* | 10/2008 | Gukeisen et al. | 244/53 R |
| 2009/0072079 A1* | 3/2009 | Hawley | 244/54 |
| 2009/0114766 A1* | 5/2009 | Sjunnesson et al. | 244/54 |
| 2009/0184198 A1* | 7/2009 | Balk | 244/54 |
| 2009/0189013 A1* | 7/2009 | Hammer | 244/54 |
| 2009/0200419 A1* | 8/2009 | Levert et al. | 244/54 |
| 2009/0212155 A1* | 8/2009 | Huggins et al. | 244/54 |
| 2009/0266932 A1* | 10/2009 | Roche et al. | 244/54 |
| 2009/0283631 A1* | 11/2009 | Roche | 244/54 |
| 2010/0001123 A1* | 1/2010 | Hillereau et al. | 244/54 |
| 2010/0155525 A1* | 6/2010 | Stuart et al. | 244/54 |
| 2011/0017866 A1* | 1/2011 | Soulier et al. | 244/54 |
| 2011/0062279 A1* | 3/2011 | Welch et al. | 244/54 |
| 2011/0127367 A1* | 6/2011 | Ramlaoui et al. | 244/54 |
| 2011/0127370 A1* | 6/2011 | Ramlaoui et al. | 244/54 |
| 2012/0080555 A1* | 4/2012 | Lafont et al. | 244/54 |
| 2012/0217372 A1* | 8/2012 | Vauchel et al. | 248/554 |
| 2013/0240666 A1* | 9/2013 | Schnelz | B64D 27/26 244/54 |

* cited by examiner

ASSEMBLY FOR MOUNTING A TURBINE ENGINE TO A PYLON

BACKGROUND OF THE INVENTION

1. Technical Field

This disclosure relates generally to a turbine engine system and, more particularly, to an assembly for mounting a turbine engine to a pylon.

2. Background Information

A turbofan engine includes a fan section and an engine core. The fan section is housed within a fan case. The engine core is housed within a core case. The core case is typically connected to the fan case through a plurality of support struts and outlet guide vanes.

The turbofan engine may be mounted to an aircraft pylon through a forward mount and an aft mount. The terms "forward" and "aft" as used herein describe relative position within the engine; e.g., an first element described as being "forward" of a second element means that the first element is closer along an axial centerline to the air inlet of the engine; the fan section is located forward of the engine's turbine section. The forward mount may be axially aligned with the outlet guide vanes, and connects an aft portion of the fan case to the pylon. The aft mount connects an aft portion of the core case to the pylon. With such an arrangement, a forward portion of the fan case and an attached inlet cowl is cantilevered relative to the forward mount and the outlet guide vanes. The fan case therefore will pitch upwards, relative to the core case, about the outlet guide vanes during turbofan engine operation, especially where the fan case has a relatively large diameter as compared to that of the core case. The outlet guide vanes therefore may be subject to a pitch moment that increases internal stresses within the vanes. To compensate for the increased internal stresses, the outlet guide vanes are typically oversized. Oversizing the outlet guide vanes, however, may increase the overall weight and cost of the turbofan engine. In addition, increasing radially heights of the outlet guide vanes may increase vane flexibility and enable rotational deflection between the fan case and the core case. Such rotational deflection may cause tips of fan blades within the fan section to rub against the fan case and reduce engine performance.

There is a need in the art for an improved assembly for mounting a turbine engine to a pylon.

SUMMARY OF THE DISCLOSURE

According to an aspect of the invention, an assembly is provided for mounting a turbofan engine to a pylon. The turbofan engine includes a fan section and an engine core. The mounting assembly includes a fan case, a first mount and a second mount. The fan case is configured to house the fan section of the turbofan engine. The first mount is connected to the fan case, and configured to mount the fan case to the pylon. The second mount is connected to the fan case, and configured to mount the fan case to the pylon independent of the first mount.

According to another aspect of the invention, another assembly is provided for mounting a turbofan engine to a pylon. The turbofan engine includes a fan section and an engine core. The mounting assembly includes a fan case, a first mount and a second mount. The fan case is configured to house the fan section of the turbofan engine. The fan section extends along an axial centerline. The first mount is connected to the fan case. The second mount is connected to the fan case and axially separated from the first mount. The first mount and the second mount are each configured to mount the fan case to the pylon.

According to still another aspect of the invention, a turbine engine system is provided that includes a turbine engine first case, a turbine engine second case, a vane and a plurality of case-to-pylon mounts. The second case is substantially coaxial with the first case. The vane is arranged radially between the first case and the second case. The case-to-pylon mounts include a first mount, a second mount and a third mount. The first mount and the second mount are each connected to the first case. The third mount is connected to the second case.

The turbine engine system may include a fan section and an engine core. The fan section may be housed within the first case (e.g., a fan case). The engine core may be housed within the second case (e.g., a core case). Alternatively, the fan section may be housed within the second case (e.g., a fan case). The engine core may be housed within the first case (e.g., a core case).

The first mount may be structurally independent of the second mount. The second mount, for example, may be configured to mount the fan case (or core case) to the pylon independent of the first mount.

The fan case may extend along an axial centerline between a first end and a second end.

The first mount may be axially separated from the second mount.

The first mount may be connected to the fan case at the first end. The first mount, for example, may be connected to the fan case on, adjacent or proximate the first end. The second mount may also or alternatively be connected to the fan case at the second end. The second mount, for example, may be connected to the fan case on, adjacent or proximate the second end.

The first mount may be configured to transfer an axial thrust load between the fan case and the pylon. The second mount may also or alternatively be configured to transfer a radial load, a lateral load and/or a torsional load between the fan case and the pylon.

The first mount may include a plurality of links such as, for example, struts. These struts may be arranged circumferentially around the axial centerline. Each of the struts may be connected to and extend axially away from the fan case.

The second mount may include a mount beam and a plurality of links. These links may be arranged circumferentially around the axial centerline. The links may connect the mount beam to the fan case.

The first mount may include a link such as, for example, a strut. This strut may be substantially circumferentially centered between the links. The strut may be connected to and extend axially away from the fan case.

The mounting assembly may include a core case and a third mount. The core case may be configured to house the engine core of the turbofan engine. The third mount may be connected to the core case, and configured to mount the core case to the pylon.

The mounting assembly may include one or more vanes arranged radially between the fan case and the core case, and circumferentially around the axial centerline.

The third mount may include a mount beam and a plurality of links These links may be arranged circumferentially around an axial centerline of the core case, and connect the mount beam to the core case. The third mount may also or alternatively include one or more thrust links such as, for example, struts. These struts may be connected to and/or extend axially between the mount beam and the core case.

The mounting assembly may include a fourth mount that is connected to the core case and configured to mount the core case to the pylon.

The case-to-pylon mounts may include a fourth mount that is connected to the second case.

The turbine engine assembly may include a pylon. The first mount, the second mount and the third mount may each be connected to the pylon. The fourth mount may also be connected to the pylon.

The foregoing features and the operation of the invention will become more apparent in light of the following description and the accompanying drawings.

DETAILED DESCRIPTION OF THE INVENTION

Figure 1:
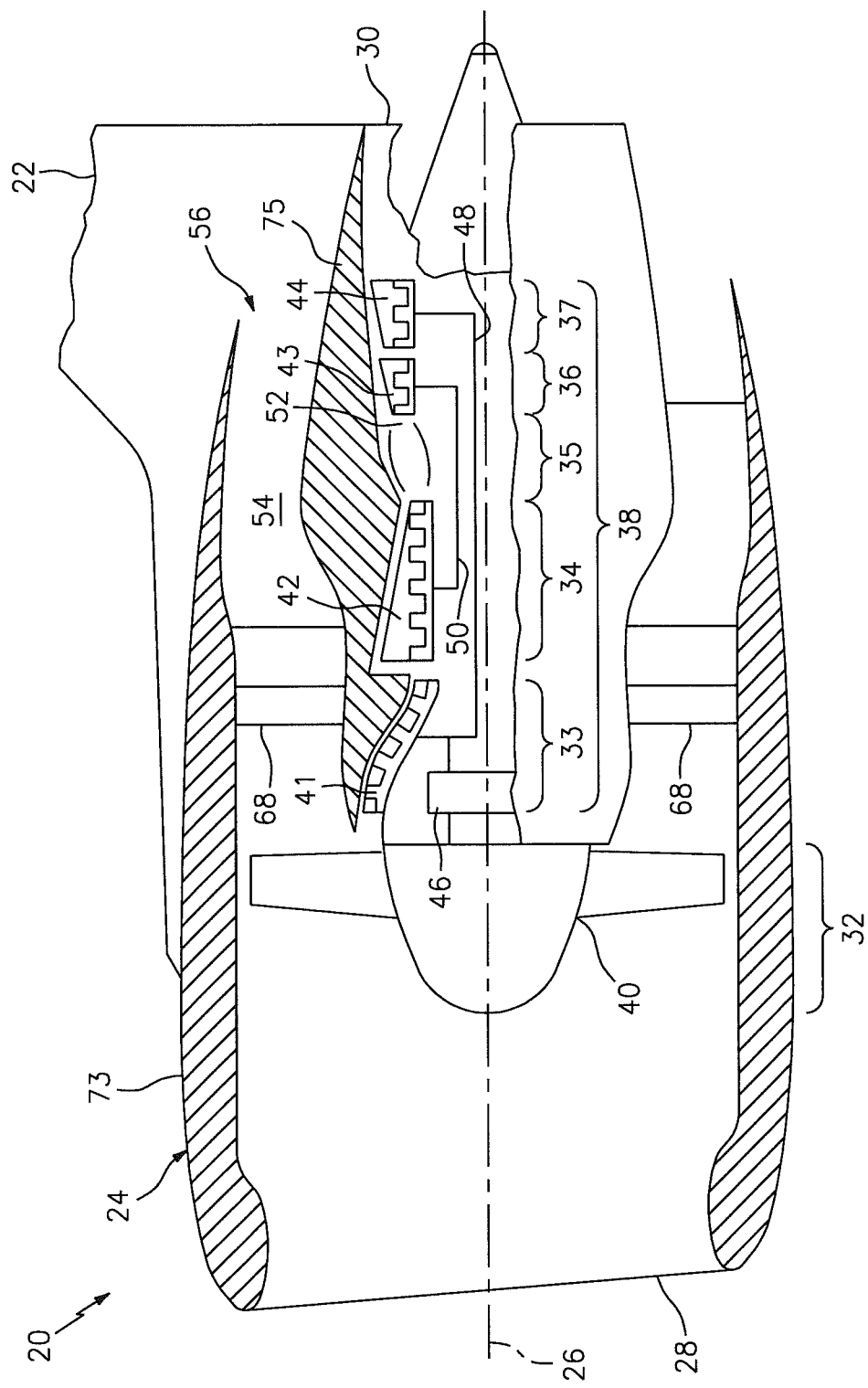
FIG. 1 is a side cutaway illustration of a turbine engine system.

FIG. 1 is a side cutaway illustration of a turbine engine system 20. The turbine engine system 20 includes a pylon 22 and a turbine engine 24 (e.g., a propulsion system) such as, for example, a geared turbofan engine that uses outlet guide vanes (OGV) to structurally connect the fan module to the core engine module as well as redirect the incoming fan flow to the OGV. The turbine engine 24 is mounted to the pylon 22, which may be mounted to or otherwise configured with an aircraft airframe. Examples of an aircraft airframe include, but are not limited to, an aircraft wing or an aircraft fuselage.

The turbine engine 24 extends along an axial centerline 26 between a forward airflow inlet 28 and an aft airflow core exhaust 30. The turbine engine 24 includes a fan section 32, a low pressure compressor (LPC) section 33, a high pressure compressor (HPC) section 34, a combustor section 35, a high pressure turbine (HPT) section 36 and a low pressure turbine (LPT) section 37. These engine sections 32, 33, 34, 35, 36, 37 are arranged sequentially along the centerline 26. The engine sections 33, 34, 35, 36, 37 form a core 38 of the turbine engine 24; i.e., an engine core.

Each of the engine sections 32, 33, 34, 36 and 37 includes a respective rotor 40, 41, 42, 43, 44. Each of the rotors 40, 41, 42, 43, 44 includes a plurality of rotor blades arranged circumferentially around and connected to one or more respective rotor disks. The fan rotor 40 is connected to a gear train 46. The gear train 46 and the LPC rotor 41 are connected to and driven by the LPT rotor 44 through a low speed shaft 48. The HPC rotor 42 is connected to and driven by the HPT rotor 43 through a high speed shaft 50.

Air enters the turbine engine 24 (e.g., the propulsion system) through the airflow inlet 28, and is directed through the fan section 32 and into a core gas path 52 and a bypass gas path 54. The air within the core gas path 52 may be referred to as "core air". The air within the bypass gas path 54 may be referred to as "bypass air". The core air is directed through the engine sections 33, 34, 35, 36, 37, and exits the turbine engine 24 through the airflow core exhaust 30. Within the combustor section 35, fuel is injected into and mixed with the core air and ignited to provide forward engine thrust. The bypass air is directed through the bypass gas path 54, and out of the turbine engine 24 through an aft airflow bypass exhaust 56 to provide additional forward engine thrust. The bypass air may also or alternatively be directed through a thrust reverser to provide reverse engine thrust.

Figure 2:
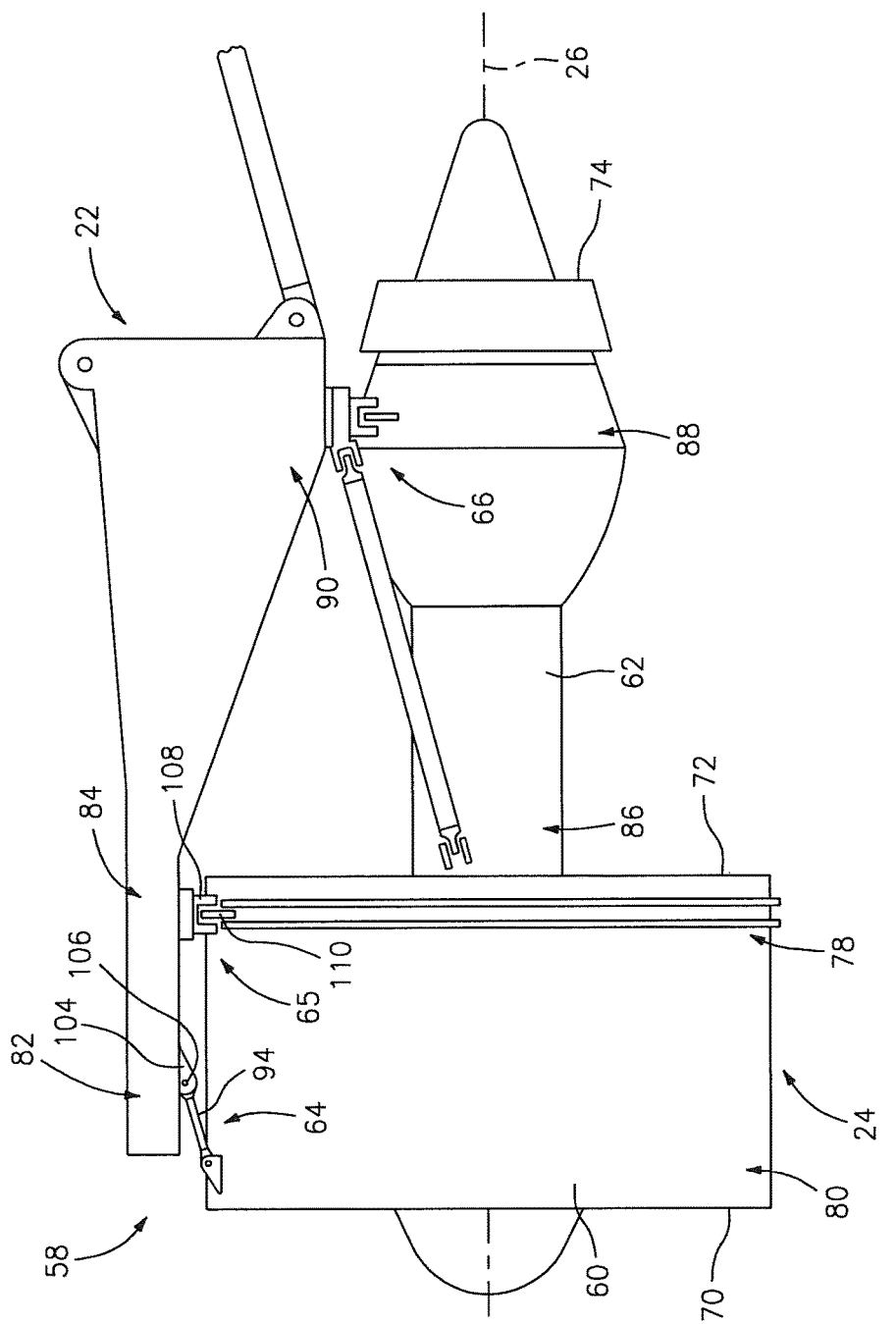
FIG. 2 is a side illustration of an assembly for mounting a turbine engine to a pylon.
Figure 3:
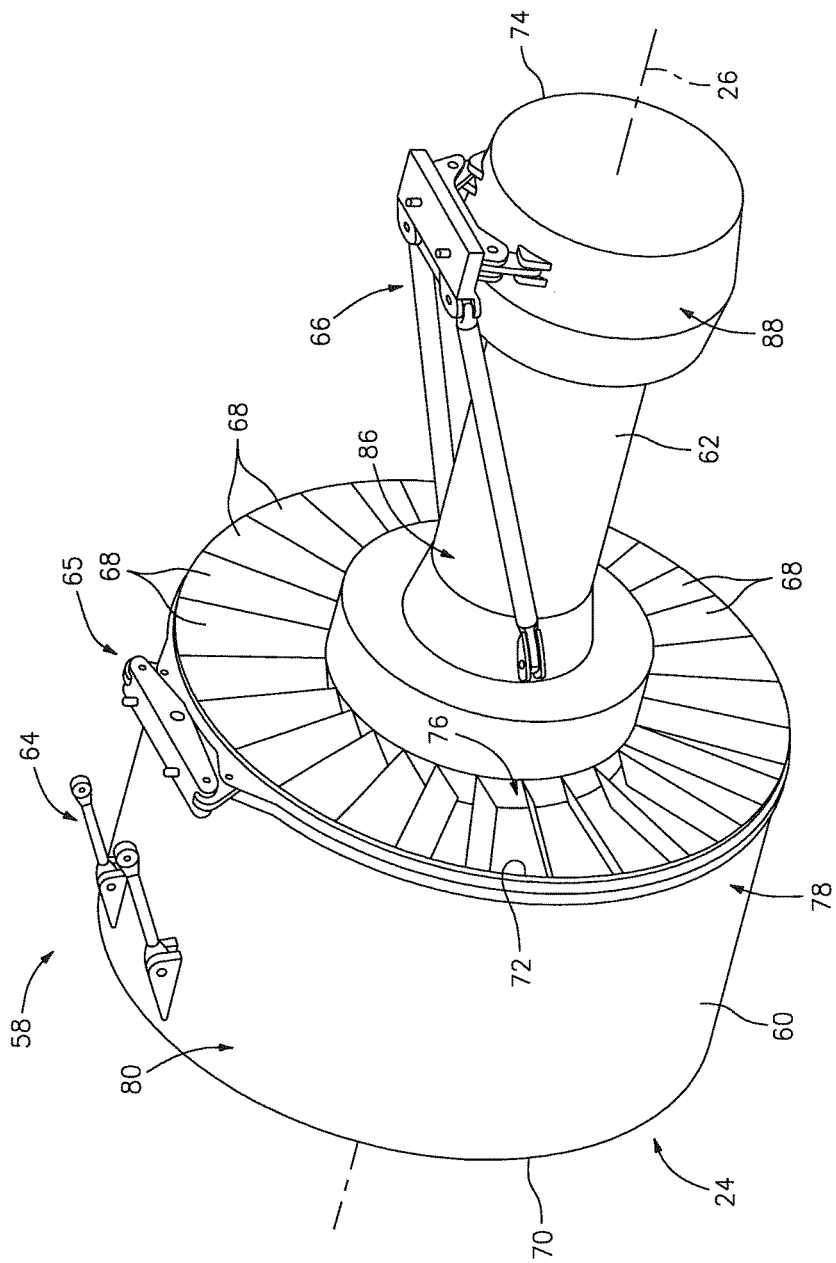
FIG. 3 is a perspective illustration of the mounting assembly and the turbine engine of FIG. 2.

FIG. 2 is a side illustration of an assembly 58 for mounting the turbine engine 24 to the pylon 22. The mounting assembly 58 includes a turbine engine first case 60, a turbine engine second case 62 and a plurality of case-to-pylon mounts 64, 65, 66. Referring to FIG. 3, the mounting assembly 58 also includes one or more vanes 68; e.g., bypass outlet guide vanes.

The first case 60 may be configured as a fan case. For example, referring to FIGS. 1 and 3, this fan case 60 may house the fan section 32, and may be housed within an aerodynamic fan nacelle 73. Referring again to FIG. 3, the fan case 60 extends axially along the centerline 26 between a fan case forward end 70 and a fan case aft end 72. The fan case 60 extends circumferentially around the centerline 26. The fan case 60 may have a diameter that may be, for example, between about two and eight times greater than maximum and minimum diameters respectively of the second case 62. The mounting assembly 58, however, is not limited to any particular fan case 60 and core case 62 dimensional relationships.

The second case 62 may be configured as a core case. For example, referring to FIGS. 1 and 3, this core case 62 may house at least a portion of the core 38. The core case 62 may also be housed within an aerodynamic core nacelle 75, where the core nacelle 75 and the fan nacelle 73 define the bypass gas path 54. Referring again to FIG. 3, the core case 62 extends axially along the centerline 26 between a core case forward end and a core case aft end 74. The core case 62 extends circumferentially around the centerline 26, and is substantially coaxial with the fan case 60. A forward portion 76 of the core case 62 adjacent its forward end may be arranged radially within the fan case 60.

The vanes 68 are arranged circumferentially around the centerline 26, and radially between the fan case 60 and the core case 62. These vanes 68 may connect and extend radially between the forward portion 76 of the core case 62 and an aft portion 78 of the fan case 60. One or more of the vanes 68, for example, may each be configured as a structural outlet guide vane that structurally ties the fan case 60 and the core case 62 together. The structural outlet guide vane also guides the flow of bypass air through the bypass gas path 54 of FIG. 1. Alternatively, one or more of the vanes 68 may each include a strut that extends radially through a vane fairing. The strut structurally ties the fan case 60 and the core case 62 together. The fairing guides the flow of bypass air through the bypass gas path 54.

Referring to FIG. 2, the case-to-pylon mounts 64, 65, 66 mount the turbine engine cases 60 and 62 and thus the turbine engine 24 to the pylon 22. More particularly, the case-to-pylon mounts 64, 65, 66 are configured and/or arranged to structurally tie each of the turbine engine cases 60 and 62 to the pylon 22 at a plurality of different axial locations along the centerline 26.

The case-to-pylon mounts may include a first mount 64 (e.g., a fan case mount), a second mount 65 (e.g., a fan/core case mount), and a third mount 66 (e.g., a core case mount). The first mount 64 may structurally tie a forward portion 80 of the fan case 60 to a forward portion 82 of the pylon 22. The second mount 65 may structurally tie the aft portion 78 of the fan case 60 to an intermediate portion 84 of the pylon 22, structurally independent of the first mount 64. Referring to FIGS. 2 and 3, the second mount 65 may also structurally tie the forward portion 76 of the core case 62 to the intermediate portion 84 of the pylon 22 through one or more of the vanes 68, which may be substantially axially aligned with the second mount 65. The third mount 66 may structurally tie an intermediate portion 86 and/or an aft portion 88 of the core case 62 to an aft portion 90 of the pylon 22, structurally independent of the second mount 65.

Vanes connecting a core case to a fan case of a prior art turbofan engine may be subject to a pitch moment as described above. The configuration of the present mounting assembly 58, in contrast, may reduce or substantially prevent such a pitch moment acting on its vanes 68. The first mount 64, for example, transfers loads between the forward portion 80 of the fan case 60 and the forward portion 82 of the pylon 22. The first mount 64 therefore supports the forward portion 80 of the fan case 60 and thereby reduces or substantially eliminates a tendency for the fan case 60 to pitch, relative to the core case 62, about the vanes 68 during turbine engine 24 operation. In this manner, the case-to-pylon mounts 64, 65, 66 may reduce internal stresses within the vanes 68.

Figure 4:
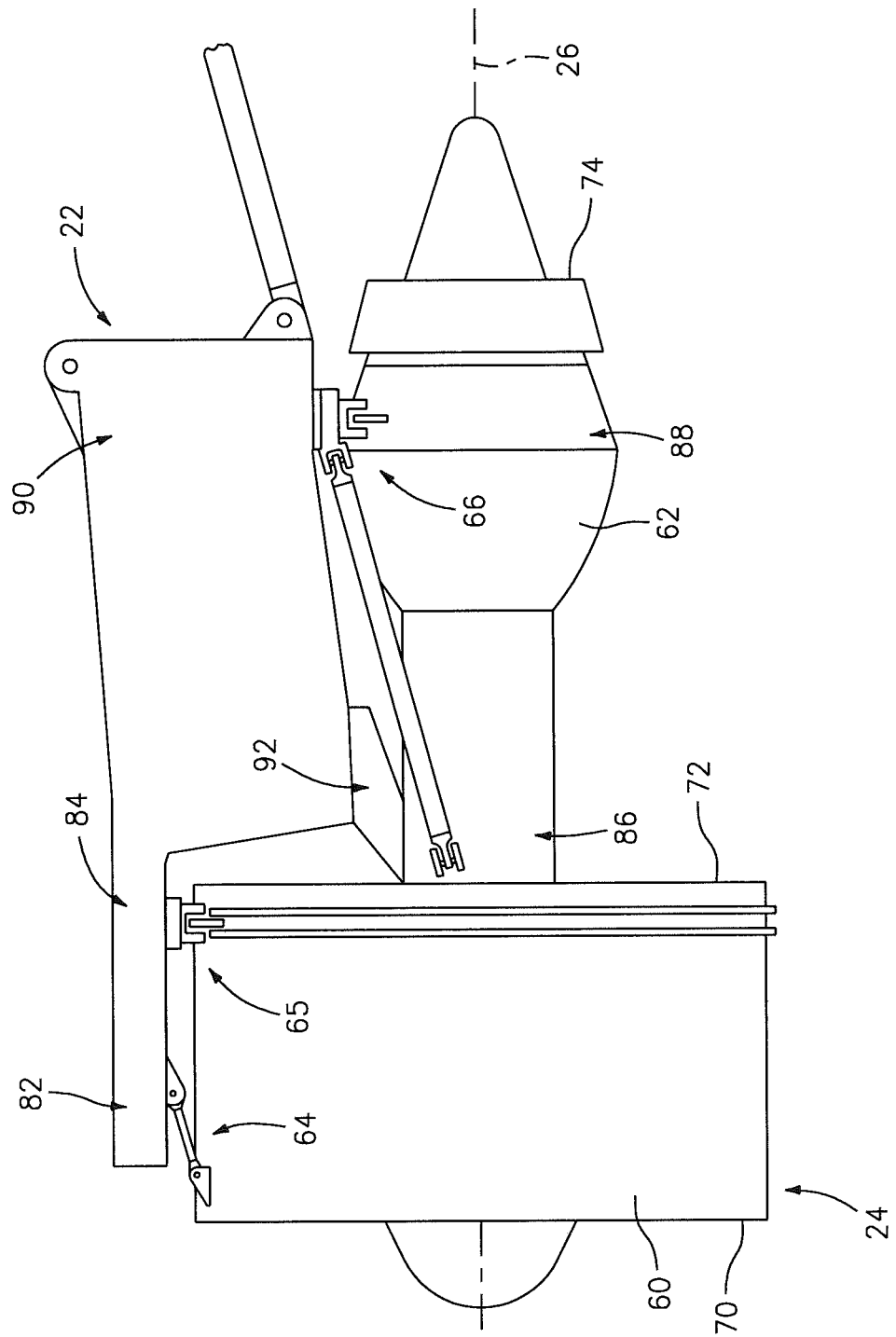
FIG. 4 is a side illustration of another assembly for mounting a turbine engine to a pylon.

Referring to FIG. 4, loads carried by and thus internal stresses within the vanes 68 (see FIG. 3) may be further reduced by structurally tying the intermediate portion 86 (or forward portion 76) of the core case 62 to the pylon 22 with a fourth mount 92 (e.g., a core case mount). With such a configuration, rather than transferring loads from the core case 62 to the pylon 22 through the vanes 68 and the second mount 65 (e.g., a fan case mount), some or all of these loads may be transferred through the fourth mount 92.

In addition, by structurally supporting the core case 62 with the fourth mount 92 of FIG. 4, one or more of the vanes 68 may be axially misaligned with (e.g., spaced from) the second mount 65, or omitted depending upon the turbine engine design. The turbine engine 24 therefore may have a module design with a first module and a second module that are substantially independently supported. The first module may include the fan section 32 and/or fan case 60. The second module may include the engine core 38 and/or the core case 62. Such a modular configuration may enable each module to be installed, serviced and/or replaced substantially independent of the other module.

The case-to-pylon mounts 64, 65, 66 and 92 may each have various configurations depending upon particular designs of the turbine engine 24 and/or the pylon 22. At least one of the case-to-pylon mounts 64, 65, 66 and 92 (e.g., the first mount 64) may be configured to primarily transfer thrust (e.g., axial) loads between the respective turbine engine case 60, 62 (e.g., the fan case 60) and the pylon 22. One or more of the case-to-pylon mounts 64, 65, 66 and 92 (e.g., the second mount 65 and/or the fourth mount 92) may each be configured to primarily transfer radial and/or torsional (e.g., circumferential) loads between a respective one of the turbine engine cases 60, 62 and the pylon 22. At least one of the case-to-pylon mounts 64, 65, 66 and 92 (e.g., the third mount 66) may be configured to transfer thrust, radial and/or torsional loads between the respective turbine engine case 60, 62 (e.g., the core case 62) and the pylon 22.

Figure 5:
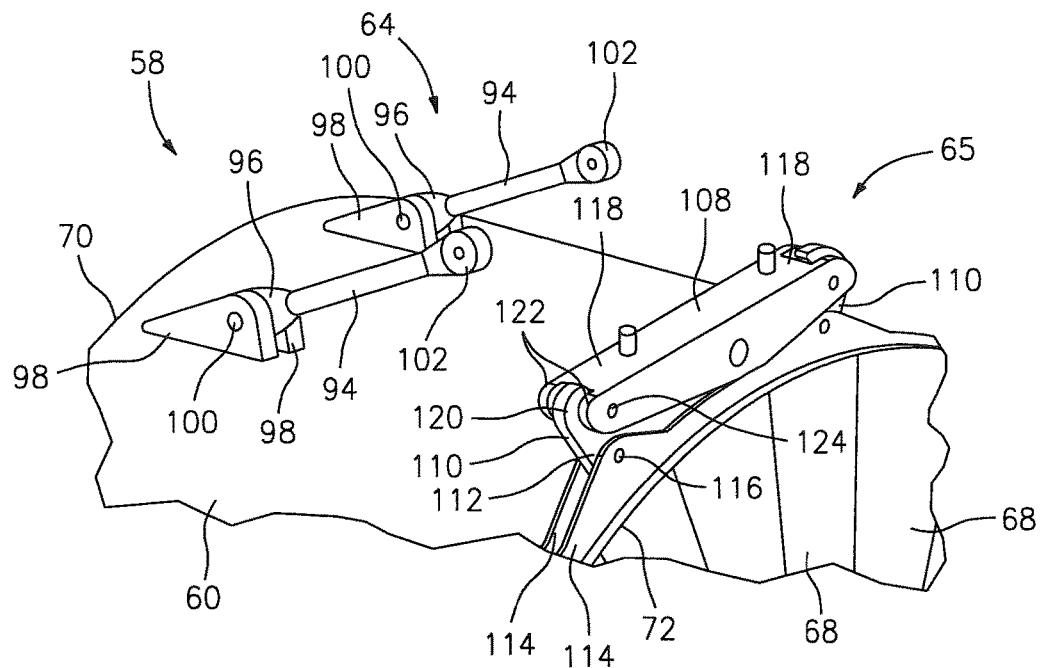
FIG. 5 is a perspective illustration of a portion of the mounting assembly and the turbine engine of FIG. 3.

The first mount 64 embodiment of FIG. 5 includes one or more thrust links 94 such as, for example, a pair of thrust struts. These thrust links 94 are axially aligned with one another, and arranged circumferentially around the centerline. Each of the thrust links 94 is connected to the fan case 60 at (e.g., on, adjacent or proximate) its forward end 70. For example, a spherical bearing or eye at a forward end 96 of the respective thrust link 94 is attached to a pair of tabs 98 on the fan case 60 by a fastener 100 (e.g., a bolt or pin). Referring to FIGS. 2 and 5, each of the thrust links 94 extends axially away from the fan case 60 and is connected to the forward portion 82 of the pylon 22. For example, a spherical bearing or eye at an aft end 102 of the respective thrust link 94 is attached to a pair of tabs 104 on the pylon 22 by a fastener 106.

The second mount 65 embodiment of FIG. 5 includes a mount beam 108 and one or more (e.g., radial and/or lateral) links 110 such as, for example, a pair of radial struts. These links 110 are axially aligned with one another, and arranged circumferentially around the centerline 26. Each of the links 110 is connected to the fan case 60 at its aft end 72. For example, an eye or spherical bearing at an inner end 112 of the respective link 110 is attached to a pair of flanges 114 on the fan case 60 by a fastener 116. Each of the links 110 extends substantial radially (and/or laterally) away from the fan case 60 and is connected to a respective lateral end 118 of the mount beam 108. For example, an eye or spherical bearing at an outer end 120 of the respective link 110 is attached to a pair of tabs 122 on the mount beam 108 by a fastener 124. For sake of clarity, the terms "inner" and "outer" are used here to describe radial position relative to an axial centerline within the engine; e.g., the inner end 112 is located radially inside of the outer end 120, and therefore closer to the axial centerline. Referring to FIG. 2, the mount beam 108 is attached to the pylon 22 by one or more fasteners.

Figure 6:
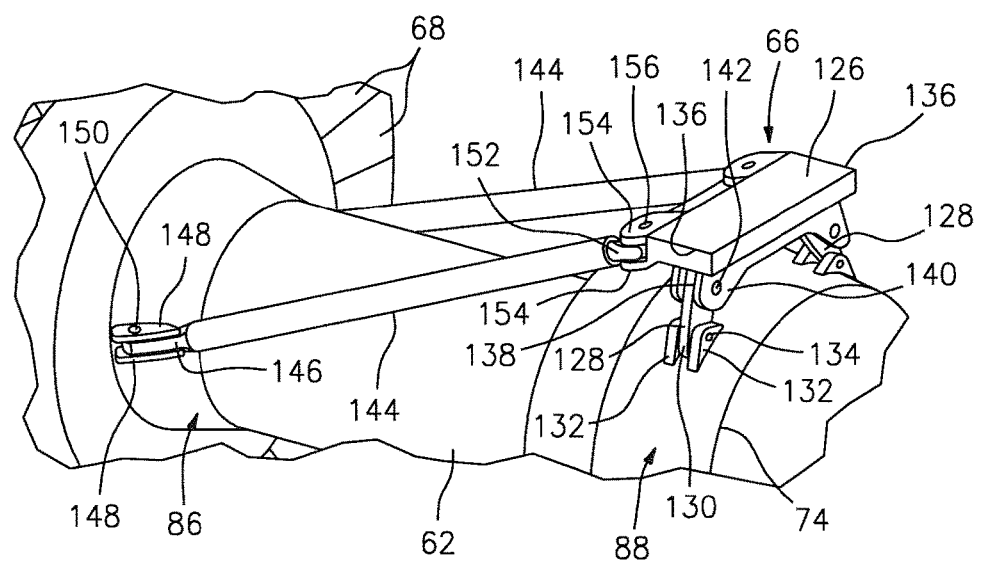
FIG. 6 is a perspective illustration of a portion of the mounting assembly and the turbine engine of FIG. 3

The third mount 66 embodiment of FIG. 6 includes a mount beam 126 and one or more (e.g., lateral and/or radial) links 128 such as, for example, a pair of lateral struts. Each of the links 128 is connected to the core case 62 at its aft end 74. For example, an eye or spherical bearing at an inner end 130 of the respective link 128 is attached to a pair of tabs 132 on the core case 62 by a fastener 134. Each of the links 128 extends substantial laterally away from the core case 62 and is connected to a respective lateral end 136. For example, an eye or spherical bearing at an outer end 138 of the respective link 128 is attached to a pair of tabs 140 on the mount beam 126 by a fastener 142. Referring to FIG. 2, the mount beam 126 is attached to the pylon 22 by one or more fasteners.

Referring to FIG. 6, the third mount 66 may also include one or more thrust links 144 such as, for example, a pair of thrust struts. Each of the thrust links 144 is connected to the intermediate portion 86 (or forward portion 76) of the core case 62. For example, a spherical bearing or eye at a forward end 146 of the respective thrust link 144 is attached to a pair of tabs 148 on the core case 62 by a fastener 150. Each of the thrust links 144 extends axially away from the core case 62 and is connected to a respective lateral end 136. For example, a spherical bearing or eye at an aft end 152 of the respective thrust link 144 is attached to a pair of tabs 154 on the mount beam 126 by a fastener 156.

Figure 7:
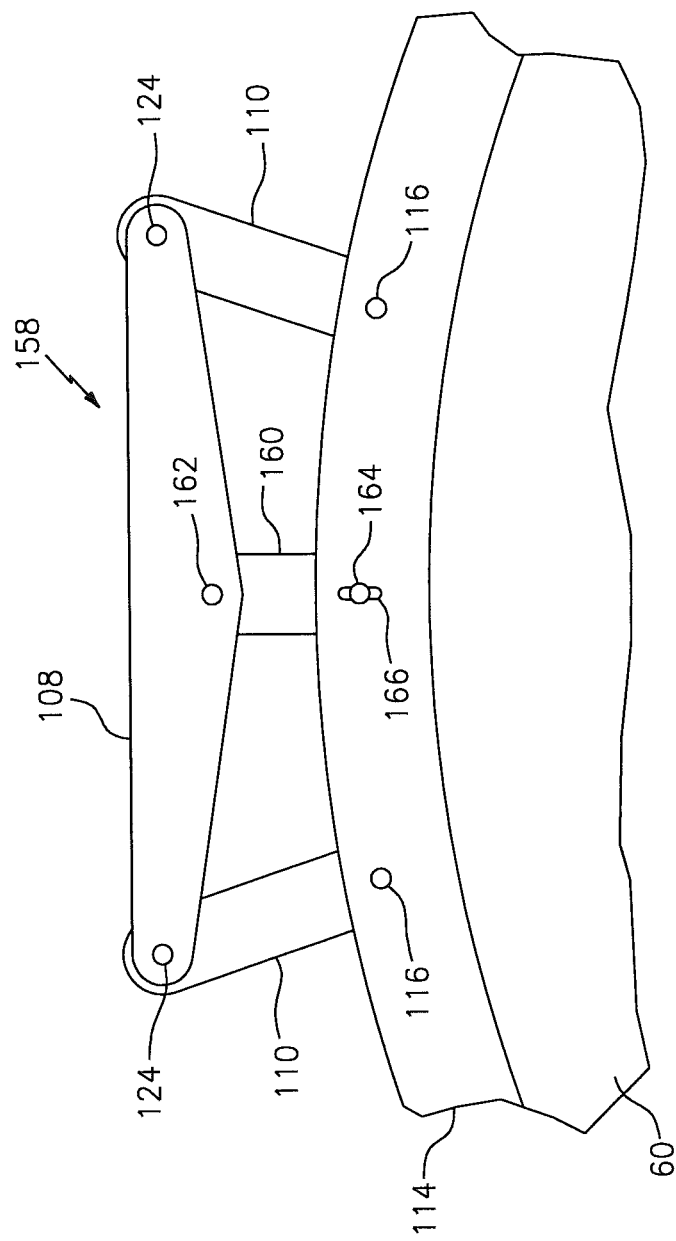
FIG. 7 is a block diagram illustration of an alternate embodiment mount for the assembly of FIG. 2.

FIG. 7 illustrates an alternative embodiment second mount 158. In contrast the second mount 65 of FIG. 5, the second mount 158 includes an intermediate link 160 configured as, for example, a "waiting fail-safe" link. This link 160 is arranged laterally between the links 110, and extends radially between the mount beam 108 and the flanges 114.

Figure 8:
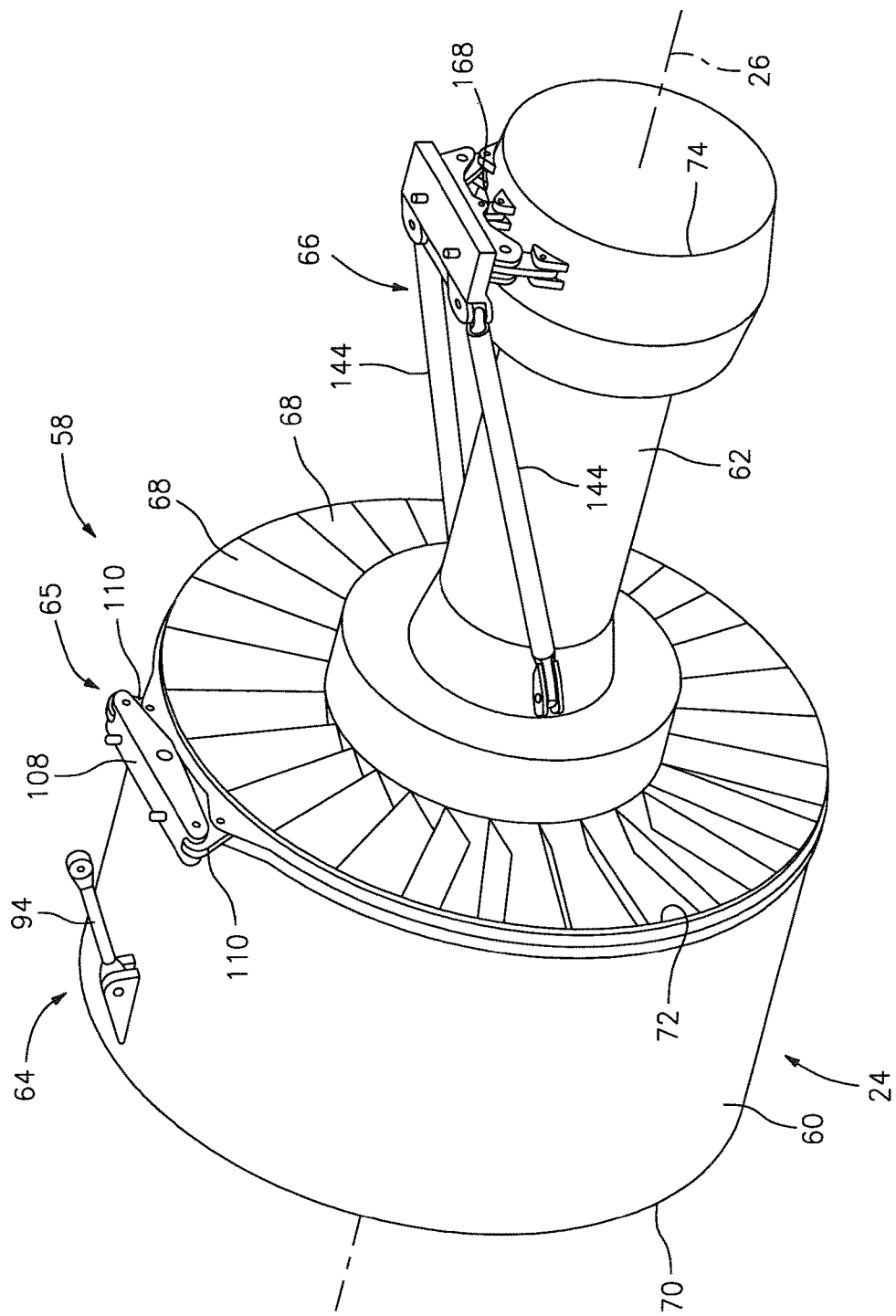
FIG. 8 is a perspective illustration of another mounting assembly configured with a turbine engine.

The link 160 is connected to the mount beam 108 by a fastener 162. The link 160 is connected to the flanges 114 by a fastener 164, which is arranged within a radially extending slot 166 of the flanges 114. In this manner, the link 160 may be substantially unloaded where the links 110 are intact, but structurally tie the mount beam 108 to the flanges 114 if one or more of the links 110 fail. The third mount 66 may similarly include an intermediate link 168 as illustrated in FIG. 8.

The case-to-pylon mounts 64, 65, 66 and 92 may each have various configurations other than those described above. For example, referring to FIG. 8, the first mount 64 may include a single thrust link 94. This thrust link 94 may be substantially laterally (e.g., circumferentially or tangentially) centered between the links 110 of the second mount 65. In another example, one or more of the links 110 may each be connected to the mount beam 108 with a plurality of fasteners; e.g., a load bearing bolt and a waiting fail-safe bolt or pin. In another example, one or more of the case-to-pylon mounts 64, 65, 66 and/or 92 may be structurally tied together by an intermediate member. In still another example, the thrust links 144 of the third mount 66 may be omitted where, for example, the fourth mount 92 of FIG. 4 is configured to at least transfer thrust loads between the core case 62 and the pylon 22. The present invention therefore is not limited to any particular case-to-pylon mount configurations.

In some embodiments, the turbine engine system may omit one or more of the case-to-pylon mounts 64, 65, 66 and 92 and/or include one or more additional case-to-pylon mounts. For example, referring to FIG. 4, the second mount 65 (or the first mount 64) may be omitted since the fourth mount 92 may structurally support the aft portion 78 of the fan case through the vanes 68. The present invention therefore is not limited to any particular arrangement or number of case-to-pylon mounts.

The turbine engine system 20 may include a turbine engine with various configurations other than the one described above. The turbine engine system 20, for example, may include a geared or non-geared turbine engine configured with a single spool, with two spools (e.g., see FIG. 1), or with more than two spools. The turbine engine system 20 may also or alternatively include a pylon with various configurations other than the one described above. The present invention therefore is not limited to any particular types or configurations of turbine engines or pylons.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for mounting a turbofan engine to a pylon, the turbofan engine comprising a fan section and an engine core, the pylon comprising a first portion and a second portion axially aft of the first portion, the assembly comprising:
    a fan case configured to house the fan section of the turbofan engine;
    a first mount connected to the fan case, and configured to mount and structurally tie the fan case to the first portion of the pylon, and the first mount comprising a strut, the strut connected to and extending axially aft from the fan case, and the strut configured to transfer an axial thrust load between the fan case and the first portion of the pylon; and
    a second mount connected to the fan case, and configured to mount and structurally tie the fan case to the second portion of the pylon independent of the first mount.

2. The assembly of claim 1, wherein
    the fan case extends along an axial centerline; and
    the first mount is axially separated from the second mount.

3. The assembly of claim 1, wherein
    the fan case extends along an axial centerline between a first end and a second end; and
    the first mount is connected to the fan case at the first end, and the second mount is connected to the fan case at the second end.

4. The assembly of claim 1, wherein the second mount is configured to transfer one or more of a radial load, lateral load or a torsional load between the fan case and the pylon.

5. The assembly of claim 1, wherein the strut is a first strut, the first mount further includes a second strut, the first strut and the second strut are arranged circumferentially around an axial centerline of the fan case, the second strut is connected to and extends axially aft from the fan case, and the second strut is configured to transfer an axial thrust load between the fan case and the first portion of the pylon.

6. The assembly of claim 1, wherein
    the second mount includes a mount beam and a plurality of links; and
    the links are arranged circumferentially around an axial centerline of the fan case, and connect the mount beam to the fan case.

7. The assembly of claim 6, wherein the strut is substantially circumferentially centered between the links and connected to the fan case.

8. The assembly of claim 1, further comprising:
    a core case configured to house the engine core of the turbofan engine; and
    a third mount connected to the core case, and configured to mount the core case to the pylon.

9. The assembly of claim 8, further comprising at least one vane arranged radially between the fan case and the core case.

10. The assembly of claim 8, wherein
    the third mount includes a mount beam and a plurality of links; and
    the links are arranged circumferentially around an axial centerline of the core case, and connect the mount beam to the core case.

11. The assembly of claim 10, wherein the third mount further includes at least one strut that is connected to and extends axially between the mount beam and the core case.

12. The assembly of claim 8, further comprising a fourth mount connected to the core case and configured to mount the core case to the pylon.

13. An assembly for mounting a turbofan engine to a pylon, the turbofan engine comprising a fan section and an engine core, the pylon comprising a first portion and a second portion axially aft of the first portion, the assembly comprising:
    a fan case configured to house the fan section of the turbofan engine, the fan case extending along an axial centerline;
    a first mount connected to the fan case; and a second mount connected to the fan case and axially separated from and aft of the first mount;

the first mount and the second mount each configured to mount the fan case to the pylon such that the first mount structurally ties the fan case to the first portion of the pylon and the second mount structurally ties the fan case to the second portion of the pylon; and the first mount comprising a strut connected to and extending axially aft from the fan case, and the first mount configured to transfer an axial thrust load between the fan case and the first portion of the pylon.

\* \* \* \* \*